(12) United States Patent
Scholten et al.

(10) Patent No.: US 7,749,483 B2
(45) Date of Patent: Jul. 6, 2010

(54) METHOD FOR PRODUCING ALKALINE EARTH METAL OXIDES

(75) Inventors: Thomas Scholten, Barsinghausen (DE); Michael Fooken, Seelze (DE); Jessica Mauer, Wunstorf (DE); Andreas Kanschik-Conradsen, Garbsen (DE); Michael Hau, Soldorf (DE)

(73) Assignee: Honeywell International Inc., Morristown, NJ (US)

( * ) Notice: Subject to any disclaimer, the term of this patent is extended or adjusted under 35 U.S.C. 154(b) by 710 days.

(21) Appl. No.: 11/611,707

(22) Filed: Dec. 15, 2006

(65) Prior Publication Data

US 2008/0145308 A1 Jun. 19, 2008

(51) Int. Cl.
*C01F 11/00* (2006.01)

(52) U.S. Cl. .................. 423/635; 423/636; 423/637; 423/158; 423/165; 423/173; 423/175

(58) Field of Classification Search ......... 423/635–637, 423/158, 165, 173, 175
See application file for complete search history.

(56) References Cited

U.S. PATENT DOCUMENTS

| | | | |
|---|---|---|---|
| 1,729,428 | A | 9/1929 | Lawson |
| 1,782,830 | A | 11/1930 | Pierce, Jr. |
| 1,947,952 | A | 2/1934 | Nitzschke |
| 2,382,909 | A | 8/1945 | Pierce, Jr. |
| 2,901,321 | A | 8/1959 | Horn |
| 3,743,691 | A | 7/1973 | Trew |
| 3,875,298 | A | 4/1975 | Coatney et al. |
| 4,666,688 | A | 5/1987 | De Buda |

FOREIGN PATENT DOCUMENTS

| | | |
|---|---|---|
| DE | 24 19 822 | 4/1974 |
| EP | 0495937 | 7/1992 |
| WO | 97/19894 | 6/1997 |

OTHER PUBLICATIONS

108599, DE, H. Schulze, (the date is Jan. 17, 1900) p. 1, col. 2, line 10-27; claim 1.
Richter H et al—"Manufacture of Strontium Salts From Phosphorus Slags", American Chemical Society, Columbus, US, vol. 110, No. 6, Feb. 6, 1989, p. 144—Chemical Abstract—XP000019238.
American Chemical Society, Columbus, US, 1990, Chemical Abstract—XP000157123.

*Primary Examiner*—Steven Bos
(74) *Attorney, Agent, or Firm*—Erika S. Wilson

(57) ABSTRACT

Disclosed is a processes for the production of relatively high purity alkaline earth metal oxides, such as SrO, from relatively low purity forms of carbonated or other oxygenated forms of such metals, such as strontium carbonate. The relatively low purity material is exposed to conditions under which at least a portion of the metal contained therein is converted to a salt that is more readily solvated in a provided solvent than the starting material, while at the same time not substantially increasing the solubility of at least one or more of the impurities in such selected solvent. This step is then preferably followed by removal of solid or otherwise undissolved impurities from the solution. After the removal step, the solution is preferably exposed to conditions effective to form a relatively insoluble salt of the alkaline earth metal, such as a strontium salt. The insoluble salt is also preferably one that can be readily and effectively converted to the desired alkaline earth metal oxide, preferably SrO. A novel preferred thermal decomposition step disclosed.

8 Claims, 1 Drawing Sheet

METHOD FOR PRODUCING ALKALINE EARTH METAL OXIDES

BACKGROUND

This invention relates to novel methods for preparing high purity metal oxides, and particularly to high purity alkaline earth metal oxides such as strontium oxide (SrO). SrO is useful, for example, as a raw material in the production of high temperature superconductors.

Strontium oxide is frequently used in the preparation of certain types of high temperature superconducting materials, particular high temperature superconducting ceramics. High temperature superconductors are materials that conduct electricity essentially perfectly at temperatures substantially above absolute zero. For example, normal superconductors normally operate at a temperatures that are only slightly (e.g., three or four degrees above absolute zero). Many preferred high-temperature superconductors operate at substantially higher temperatures. For example, one copper oxide-based high-temperature superconductor is composed of bismuth, strontium, calcium, copper and oxygen (frequently referred to as BSCCO or BIS-ko), and this material has a critical temperature of about 100° K. Such BSCCO superconductor are typically made up of a repeating series of layers: two bismuth oxide layers, a strontium oxide layer, and two copper oxide layers with some calcium atoms sandwiched between them. Such copper oxide superconductors may be used, for example, in electric power transformers and in mobile-phone base stations. Currently such materials are being tested in experimental biomedical devices, such as magnetic resonance imaging machines.

High temperature superconductors have also been developed from systems comprising [Y or La (lanthanoids)]-(Ba or Sr)—Cu—O (with a critical temperature of about 90° K).

One difficulty with the use of such materials is that relatively small amounts of impurities in one or more of the layers may interfere with the mechanism creating the superconductivity. The use of strontium oxide (SrO) for applications such as this thus generally requires a material of relatively high purity, particularly with respect to metal impurities, in which case even trace amounts of such impurities may be detrimental to the functioning of such materials. Furthermore, such materials frequently are preferred to have a relatively fine and homogeneous particle size distribution in order to enhance the use in such applications. In addition, it is desirable in many such applications for the assay of the material to be relatively high, which is generally difficult to achieve due the hygroscopic properties of SrO and the high tendency to absorb $CO_2$ from the atmosphere.

One known method for the preparation of SrO is thermal decomposition of strontium carbonate ($SrCO_3$) or a strontium hydroixide such as strontium dihydroxide ($Sr(OH)_2$). For example, WO 97119894 describes the preparation of SrO by thermal treatment of $Sr(OH)_2$ at a temperature between 400° C. and 900° C. One disadvantage of this method is that $Sr(OH)_2$ has a melting point of 375° C., and as a result this process proceeds in a highly alkaline melt which has a tendency to attack or otherwise degrade the material from with the reaction vessels are made, such as ceramic and metal. It is very disadvantageous, and perhaps not practically possible under such conditions to produce high purity SrO.

Preparation of SrO by thermal treatment of $SrCO_3$ has been disclosed. Generally, the decomposition step that has been heretofore commonly used involves the introduction of solid $SrCO_3$ particles into a reaction vessel heated to temperatures of about 1290° C. under atmospheric pressure. One disadvantage of such method is that the SrO prepared in this manner tends to form extremely hardened solid materials, and removal of the reaction product from the crucible or other vessel can be difficult and/or inefficient and/or ineffective.

One proposed alternative is suggested in U.S. Pat. Nos. 1,782,830 and 2,382,909. The process disclosed in these patents mix the $SrCO_3$ with carbon black before the thermal treatment process. One disadvantage of this method is that non-volatile or combustible impurities create impurities in the SrO. A similar process using a rotary furnace is disclosed in DT 24 19 822.

Attempts have been made to overcome the hardening issue by performing the thermal treatment step under a hydrogen atmosphere (U.S. Pat. No. 1,947,952) or in vacuum (U.S. Pat. No. 1,729,428). Both methods require advanced, relatively expensive furnace configurations, and associated high costs in investment and potentially operation to carry out such preparation procedures on an industrial scale.

U.S. Pat. No. 3,743,691 suggest purifying commercially available $SrCO_3$ by first thermally treating relatively low purity $SrCO_3$ using a rotary furnace or a fluid bed furnace to form a mixture containing SrO. This step is then followed by hydrating the SrO in the reaction product to produce $Sr(OH)_2$, followed by dissolution of the dihydroxide in water. Insoluble solids contained in the reaction product are then removed by filtration. The filtrate is then exposed to a carbonation step in which inorganic carbonates are added to the aqueous solution and $SrCO_3$ is formed. This process has disadvantages. For example, the SrO which is formed as an intermediate in this process contains substantial impurities. Also, another disadvantage is that the yield of purified $SrCO_3$ per unit volume is relatively low due to the low solubility of $Sr(OH)_2$ in water.

SUMMARY

In one aspect, applicants have discovered processes for the production of relatively high purity alkaline earth metal oxides, such as SrO, from relatively low purity forms of carbonated or other oxygenated forms of such metals, such as strontium carbonate, which overcome one or more of the difficulties described above and which provide other advantages. In this aspect of the invention, a relatively low purity material, such as technical grade $SrCO_3$, is used as the starting material and has as one potential advantage the use of a relatively low cost starting material. The relatively low purity material, such as $SrCO_3$, is exposed to conditions under which at least a portion of the metal carbonate contained therein is converted to a salt that is more readily solvated in a provided solvent, preferably an aqueous solvent, than the carbonated starting material, such as $SrCO_3$, while at the same time not substantially increasing the solubility of at least one or more of the impurities in such selected solvent. This step, which provides an increased concentration of alkaline earth metal ions, such as Sr ions, in solution, is then preferably followed by removal of solid or otherwise un-dissolved impurities from the solution. In certain embodiments the removal step may include the step of forming solid salts of impurities that are dissolved in the solution, preferably without substantially decreasing the amount and/or concentration of the desired metal ions in the solution. After the removal step, the solution is preferably exposed to conditions effective to form a relatively insoluble salt of the alkaline earth metal, such as a strontium salt, preferably without adding any substantial amount of difficult-to-remove impurities into the solution. The insoluble salt is also preferably one that can be readily and effectively converted to the desired alkaline earth metal oxide, preferably SrO, and certain aspects of the present invention involve removal of the insoluble salt from solution, preferably by precipitation, and subsequent conversion of the insoluble salt to the desired alkaline earth metal oxide, preferably by the preferred thermal decomposition step disclosed herein, to form a relatively high purity form of the metal oxide.

In one aspect of the invention, applicants have discovered a novel processes for the thermal decomposition of an oxygen-containing alkaline earth metal salt, such as a strontium carbonate, to an oxide of the alkaline earth metal salt. In preferred embodiments the invention provides a starting material for the thermal decomposition which has a sufficiently high amount of water, or other preferred solvent, associated with the salt that upon heating of the material the presence of the solvent tends to form a fluidized condition for the material undergoing thermal decomposition. Applicants have discovered that such a method provides an effective and efficient technique for converting an alkaline earth metal salt, such as strontium carbonate, to one or more oxides, such as SrO.

DETAILED DESCRIPTION OF PREFERRED EMBODIMENTS

Figure 1:
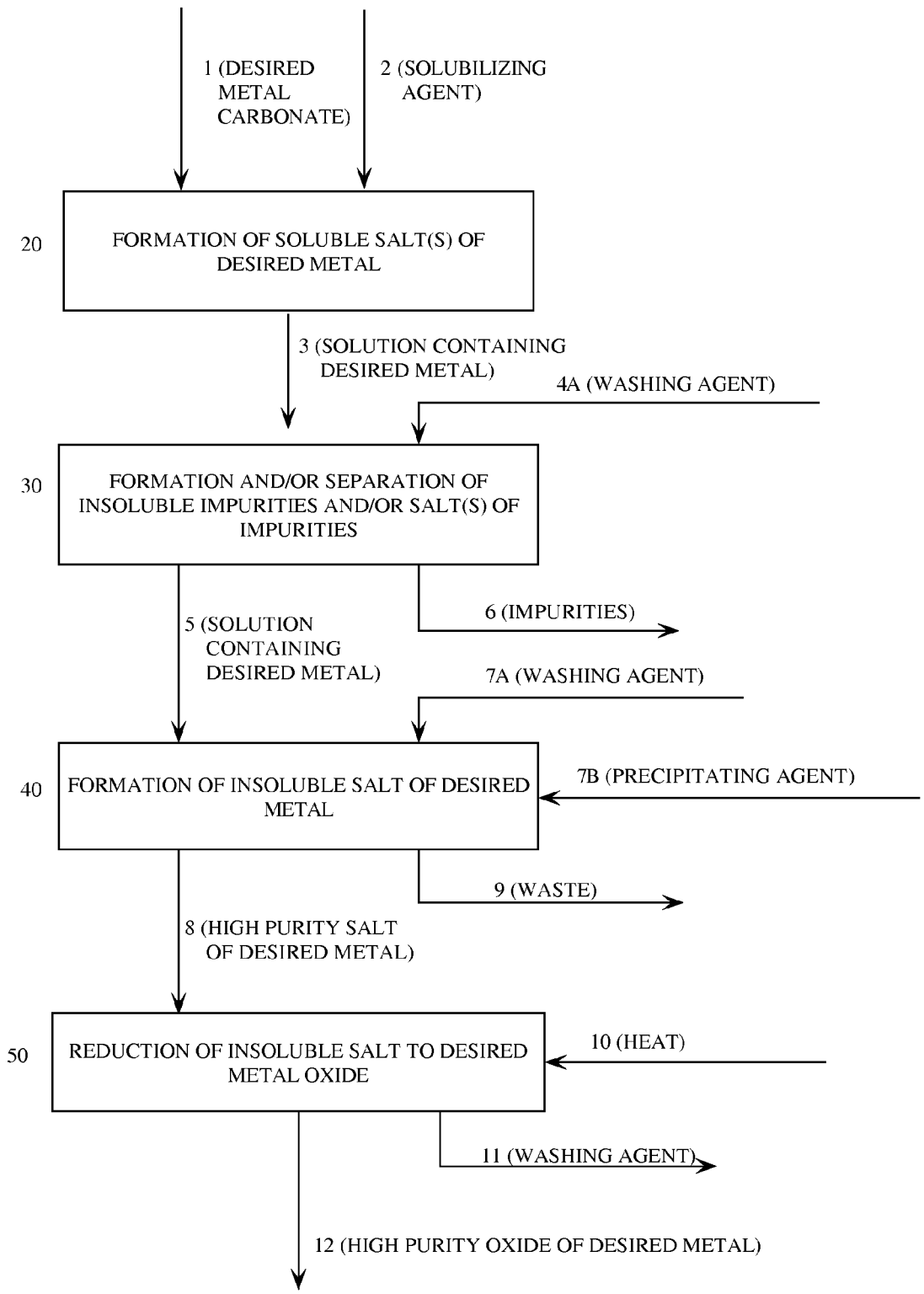
FIG. 1 is a schematic representation of one preferred embodiment of the present invention.

Certain preferred embodiments of the present invention include formation of relatively high purity SrO from relatively low purity $SrCO_3$, such as technical grade $SrCO_3$. As used herein, the term "technical grade $SrCO_3$" means a material containing more than 95% but less than about 98% (by weight) of $SrCO_3$. The term "relatively low purity $SrCO_3$" means materials that are technical grade or lower in purity. Certain preferred embodiments of the invention will now be described in connection with FIG. 1 in which a starting material, such as feed stream 1, is provided to a vessel 20, preferably continuously, although batch wise and semi-continuous processes are also contemplated. Preferably, the starting material in certain embodiments comprises relatively low purity alkaline earth metal carbonate, such as technical grade $SrCO_3$, containing one or more impurities. In certain preferred embodiments the impurities include other metals and/or compounds or salts of other metals, such silicates, iron oxides and/or barium salts. In preferred embodiments at least some of the impurities are removed prior to the step of actually forming the desired metal oxide, preferably by the thermal process as described herein.

Optionally but preferably a solubilizing agent is introduced to the starting salt, such as by introducing one or more streams 2 to the vessel 20 which is also receiving the carbonate-containing starting material. It will be appreciated that the use of a single numeral in the attached drawing is not intended to imply that the designated material is a single component material that needs to be added to the vessel at once. Rather, such a convention is used for convenience only and it is contemplated, for example, that the solubilizing agent stream 2 may in fact comprise two or more streams introduced separately into the vessel. In preferred embodiments, the solubilizing agent comprises a solvent and/or an agent (such as an acid, preferably a strong acid, and more preferably a strong aqueous acid) capable of increasing the concentration of the desired metal ion in solution. In general, it is believed that in view of the teachings contained herein those skilled in the art will be able to select for any particular application the appropriate solubilizing agent, including all inorganic and aliphatic carboxylic acids which form water soluble alkaline earth metal salts, and particularly Sr-salts. For example, in preferred embodiments, the carbonate is converted to the soluble salt $SrCl_2$ by the addition of water and HCl, preferably in an amount that is in slightly molar excess. Preferably the HCl is aqueous HCl, preferably about 5 mol % (preferably up to a pH of about 5). Preferably the solubilizing agent is effective to bring a major proportion, and more preferably substantially all, of the desired metal ions (such as Sr ions) into solution. In other embodiments, the solubilizing agent comprises aqueous or concentrated $HNO_3$.

Once the solution is formed, or optionally simultaneously with forming the solution, a washing agent 4 is brought into intimate contacted with the solution 3, preferably by adding the washing agent to the solution with agitation, such as by stirring in an appropriate vessel 30. The function of the washing agent is to assist in removal of impurities from the solution. It is intended that the washing agent of this step may not only assist in removal of insoluble impurities, but also act as a desolubilizing agent for impurities that are soluble in the solution. In the cases in which the washing agent comprises a desolubilizing agent, it is preferred that the washing agent does not substantially desolubilize the ions of the desired metal, which in preferred embodiments are Sr ions. Furthermore, it is highly preferred that the washing agent does not add further impurities to the solution, unless such impurities are easily or readily removed from solution or from the metal oxide once formed.

In preferred embodiments in which the oxygen-containing metal salt starting material is strontium carbonate, and in which the solubilizing agent is a strong acid, and particularly a strong inorganic acid, such as HCl, the washing agent comprises an aqueous peroxide solution. In preferred embodiments, the peroxide solution comprises a solution comprising from about 10% to about 40% $H_2O_2$, more preferably from about 30% to about 38%, and in certain embodiments about 35%. The amount of the washing agent is added preferably in an amount and under conditions effective to precipitate a substantial portion, and preferably substantially all, of iron ions in the solution. In preferred applications of such embodiments, the hydrogen peroxide washing agent causes precipitation of iron oxide, particularly $Fe_2O_3 \times n(H_2O)$.

It will be appreciated that the washing agent can be readily adjusted in view of the teaching contained herein to remove particular impurities found in the starting material. Thus in certain embodiments the washing agent comprises one or more components, and is added preferably in an amount and under conditions, effective to precipitate a substantial portion, and preferably substantially all of one or more impurities containing or consisting of one or more of the following metals: Al, Co, Ni, Mn, Zn and combinations of these.

The solids present in or carried by the washing agent are preferably separated from the solution by any one of well known means, including preferably comprising filtering and removal as a stream 6 to produce a purified solution 5.

It is seen therefore, seen that a purified solution 5 containing alkaline earth metal ions, and relatively reduced amount of undesirable ions of other metals or other impurities is produced in accordance with such aspects of the present invention. Preferably, the present methods also include the step of removing at least a substantial proportion, and preferably substantially all of the desired alkaline earth metal ions from the solution by forming one or more less soluble or insoluble salts from said ions. Such a step may comprise adding a precipitating agent 7B to the solution to form a precipitate comprising a high purity salt of the desired alkaline earth metal, which is shown in FIG. 1 as stream 8. The precipitation agent may itself aid in washing the precipitate from the solution or a separate washing agent 7A may be used. In the particular embodiments in which the ions are present in coordination with a negative halogen ion, such as will occur when hydrochloric acid is used as the solubilizing agent, it is preferred to precipitate the ions in the form of an oxygen containing salt, such as metal carbonate, sulfonate, phosphate and/or mixtures of the these. In certain embodiments, such as when the solution is in the form of a high alcalinic solution, for example as may be formed with KOH, NaOH or $NH_3$ solution it may be preferred to form $SrO_2$ by precipitation with stöchiometric amounts of $H_2O_2$. In such cases, however, a disadvantage may occur in connection with the difficulty of preventing thermal decomposition or explosion of SrO2. In many embodiments, metal carbonate is the preferred form of the precipitate. In many cases it is preferred to use a precipitating agent non-metallic agent, preferably a non-metallic salts in aqueous solution. In certain preferred embodiments, the formation step 40 comprises forming $SrCO_3$, preferably by adding to the solution amounts of non-metallic salts in aqueous solution, preferably water soluble carbonates, such as $(NH_4)_2CO_3$ and/or hydrogencarbonates, such as $NH_4HCO_3$, in amounts effective to combine with substantially all of the alkaline earth metal ions in the solution. $NH_4HCO_3$ and $(NH_4)_2CO_3$ are preferred since such have the advantage of avoiding contamination of the precipitated alkaline earth metal carbonate, such as $SrCO_3$, with metal ions because $NH_4$-salts formed thereby will preferably decompose within the preferred thermal treatment of the $SrCO_3$ to the preferred oxide.

In preferred embodiments, the insoluble salt formed from the purified solution, such as purified $SrCO_3$, is precipitation from the solution and then separated, for example by suction filtration. The precipitated salt is then preferably contacted with a washing agent, preferably comprising water, to remove any unwanted materials from the precipitate, such as halogen moities which might be present from the solubilization step. In certain embodiments, the filtrates is monitored during the wash step in order to continue the wash step for a time sufficient and under conditions effective to that sufficiently low amounts of such ions, such as chloride ions, are detected in the filtrate.

The metal carbonate may then be converted to the desired oxide by any one or more means and methods already known to those skilled in the art for performing such conversion. In highly preferred embodiments, however, the high purity salt 8 is converted to the desired metal oxide, preferably SrO by thermal decomposition, and even more preferably by providing the salt in a form that is capable of auto-fluidization of the salt during thermal decomposition. For example, it is preferred to provide the salt in admixture with a fluidizing agent, preferably water. In particular embodiments, for example, the salt is provided in a humid or wet state, preferably wherein the salt comprises from about 50% to about 95%, and even more preferably from about 70% to about 90% of the oxygen-containing salt, such as $SrCO_3$, and from about 5% to about 50% by weight, and even more preferably from about 10% to about 30%, of fluidizing agent, preferably water. The humid or wet material is then preferably placed in a vessel, such as an $Al_2O_3$ crucible and heated to the temperature and under conditions effective convert the salt to the oxide and to fluidize the material during the conversion step. For example, in the case of the conversion of $SrCO_3$ it is preferred to heat the material to a temperature of from about 1290° C. to about 1350° C., preferably for a time of from about 12 hours to about 20 hours. In certain preferred embodiments, the conversion step comprises heating the salt at a rate of from about 2° C. to about 4° C. per minute. In many embodiments, it has been found by the present inventors that heating rates above those preferred herein have over-energized the SrO. With respect to the total heating time in preferred embodiments, it is generally advantageous to ensure, that the decomposition of $SrCO_3$ to SrO is substantially complete. Those skilled in the art will be able to determine, based on the teachings contained herein, the preferred reaction conditions for any particular embodiment to ensure maximum conversion to the desired metal oxide, particularly SrO. In many embodiments, it is preferred to expose the salt to heat for at least about 12 hours for reaction temperatures of about 1350° C. or greater. Preferably after the reaction step is completed, the material is cooled down, preferably under dry nitrogen atmosphere in order to minimize water and $CO_2$ uptake, which would in turn might lower the SrO assay.

Although applicants do not necessarily intend to be bound by or to any particular theory of operation, it is believed that the desirable metal oxide of this invention, and particularly the SrO, in accordance with the present process is less hardened compared to the thermal treatment of non-humid $SrCO_3$ (which is usually obtained as a extremely hard block out of the reaction vessel) is that the slow boiling-off of water out of the humid material leads to a very open structured material, before the decomposition of SrCO3 proceeds. This structure minimizes or prevents sintering of the SrO under formation of a hardened material. Also it is believed that due to the high purity of the used $SrCO_3$, no or a relatively low amount of melting before the thermal decomposition of the $SrCO_3$ proceeds.

The resulting oxide, such as SrO, is removed from the vessel and in preferred embodiments milled to the desired particle size, which in certain embodiments comprises a particle size of 100%<40 µm. In preferred embodiments, the particle size distribution is about as follows: 5%<3.0 µm; 50%<8.2 µm; 95%<17.4 µm, with an average particle size of about 8.9 µm. In general, it is preferred to use finer raw material. Preferably, the assay of SrO in accordance with the present process is preferably greater than about 99%, which as used herein means SrO concentration as determined by titration of a suspension of SrO in water with diluted HCl. Preferably, the impurity level regarding 3d transition elements is less than about 10 ppm for each element such element.

EXAMPLES

Example 1—Purification of $SrCO_3$

Raw Materials:

| COMPONENT | GRAMS | Mol. weight | Mol |
|---|---|---|---|
| $SrCO_3$ | 100 | 147.63 | 0.68 |
| HCl 37% | 140 | 36.46 | 1.42 |
| $H_2O_2$ 35% | 1.0 | | |
| $NH_4HCO_3$ | 115.3 | 79.1 | 1.46 |
| Yield: | | | |
| $SrCO_3$ | 99.2 (=98.8% of the theory) | 147.63 | 0.67 |

Procedure:

100 ml of technical grade $SrCO_3$ and 100 ml of water are placed in a 500 ml beaker. 140 g of HCl 37% were added using a dropping funnel within a period of 30 minutes. $CO_2$ evolution was visible, and the temperature increased to 37° C. Then the mixture was diluted with 275 ml of water. Afterwards 1 ml of $H_2O_2$ 35% was added and the suspension was stirred at room temperature for one hour. Afterwards the suspension was filtered, to remove insoluble material and precipitated $Fe_2O_3 \times n(H_2O)$. Afterwards the solution was diluted to a volume of 600 ml and a solution of 115.3 g of $NH_4HCO_3$, dissolved in 570 ml of water was added within 1.5 hours. Afterwards the suspension was stirred for further 15 minutes. The precipitated $SrCO_3$ was separated from the mother liquor by suction filtration. The precipitate washed with about 1 L of water, till no chloride ions could be detected in the washing water by adding of a $AgNO_3$ solution in water.

Yield (humid)=124.5 g

The $SrCO_3$ contained 20.3% of water.

Preparation of $SrCO_3$

Humid $SrCO_3$ (604 g) was placed in a 2.5 l $Al_2O_3$ crucible. The material was placed in a furnace and heated to 1350° C. within 8 hours. The temperature was maintained for 15 hours, afterwards the heating unit was switched off. The cooling process to room temperature was performed under dry nitrogen atmosphere. The crude SrO was milled using a Laboratory mill IKA Type MF10.

What is claimed is:

1. A process for preparing high purity SrO from technical grade $SrCO_3$ containing at least one metal-containing non-Sr impurity, said process comprising:
   (a) reacting technical grade $SrCO_3$ with an acid in an aqueous solvent to produce a solution having a salt more readily solvated in said solvent than said $SrCO_3$;
   (b) washing said at least one impurity from the solution formed in step (a);
   (c) precipitating $SrCO_3$ from the product of step (b); and
   (d) heating the precipitated $SrCO_3$ of step (c) under condition effective to convert a substantial portion of said $SrCO_3$ to SrO.

2. The process of claim 1 wherein said acid of (a) comprises HCl.

3. The process of claim 1 wherein said reacting step is effective to place into solution as Sr ions substantially all of said Sr included in said technical grade $SrCO_3$.

4. The process of claim 1 wherein said washing step involves contacting said solution with hydrogen peroxide.

5. The process of claim 1 wherein step (c) involves contacting said salt with a non-metallic carbonate.

6. The process of claim 5 wherein said non-metallic carbonate is $NH_4HCO_3$.

7. The process of claim 5 wherein said non-metallic carbonate is $(NH_4)_2CO_3$.

8. The process of claim 1 wherein said metal-containing non-Sr impurity is selected from the group consisting of silicates, iron oxides, barium salts, Al, Co, Ni, Mn, Zn and combinations of these.

* * * * *